(12) United States Patent
Yu et al.

(10) Patent No.: US 8,522,329 B2
(45) Date of Patent: Aug. 27, 2013

(54) DATA SHARING SYSTEM WITH A DIGITAL KEY

(75) Inventors: Hong-Chi Yu, Kaohsiung (TW); Mao-Ting Chang, Kaohsiung (TW)

(73) Assignee: Walton Advanced Engineering Inc., Kaohsiung (TW)

( * ) Notice: Subject to any disclaimer, the term of this patent is extended or adjusted under 35 U.S.C. 154(b) by 0 days.

(21) Appl. No.: 13/305,950

(22) Filed: Nov. 29, 2011

(65) Prior Publication Data

US 2013/0019294 A1    Jan. 17, 2013

(30) Foreign Application Priority Data

Jul. 12, 2011   (TW) .............................. 100124611 A (51) Int. Cl.
*H04L 29/06* (2006.01)
(52) U.S. Cl.
USPC ............................................................ 726/7

(58) Field of Classification Search
None
See application file for complete search history.

(56) References Cited

U.S. PATENT DOCUMENTS

| | | | |
|---|---|---|---|
| 2006/0206720 A1* | 9/2006 | Harada et al. ................. | 713/182 |
| 2011/0047371 A1* | 2/2011 | Timby .......................... | 713/153 |

* cited by examiner

*Primary Examiner* — Jeffrey Pwu
*Assistant Examiner* — William Corum, Jr.
(74) *Attorney, Agent, or Firm* — Bacon & Thomas, PLLC (57) ABSTRACT

The present invention provides a data sharing system with a digital key in order to deliver data sharing via Internet or a local area network by means of either at least one data storage device electrically connected to a digital box or a storage space inside a memory unit of the digital box which links a server. At the moment, a computer user could use one digital key only to link a server and further complete read-out, write-in, modification, deletion or addition of data/files in the data storage device or the storage space with the digital key's peer identification code and the digital box's peer authentication code belonging to the same group validated by the server.

7 Claims, 7 Drawing Sheets

DATA SHARING SYSTEM WITH A DIGITAL KEY

BACKGROUND OF THE INVENTION

1) Field of the Invention

The present invention relates to a digital key, especially a data sharing system with a digital key.

2) Description of the Prior Art

The arrival of the Internet era prompts not only acceleration of information sharing but also popularization and progress of information technologies. For instance, more and more 3C products of computers and communications & consumer electronics have been extensively introduced into consumers' lives.

In this regard, the portable data storage devices with advantages such as lightness, portability, and plug-and-play are popular with the general public and available recently.

For a portable data storage device, a user who intends to copy data of Computer A into Computer B should electrically connect the storage device to Computer A prior to data of Computer A saved in the storage device and then electrically connect the storage device to Computer B for stored data copied or moved to Computer B for data of Computer A shared by Computer B.

However, there are still some problems existing in the method for files transmitted between a portable data storage device and a computer: (1) Data not immediately, efficiently and conveniently shared due to an actual distance between computers; (2) Data transfer efficiency simply reduced by 50% during a procedure of the same data transmitted twice in the way of a two-stage "copy in & copy out"; (3) Difficulty in file update or confusion of versions for one file duplicated multiply.

For applications of a data storage device without restrictions of distances or transfer efficiency, these said problems with respect to delivery of data/files via a data storage device still remain to be overcome.

SUMMARY OF THE INVENTION

To solve the said problems, the present invention which provides a data sharing system with a digital key in order to share data via Internet or a local area network comprises at least a digital key, at least a digital box and at least a server: In the event of both a digital key's peer identification code and the digital box's peer authentication code belonging to the same group according to the server's determination, those operations such as modification, read-out or write-in of data/files saved in either the data storage device which is electrically connected to the digital box or a storage space in a digital box's memory unit could be completed by one computer.

Accordingly, the principal object of the present invention is to allow one user's computer to link a digital box via a digital key for modification, read-out or write-in of data/files in either a data storage device which is connected to the digital box or a storage space of the digital box's memory unit as well as data easily, effectively and conveniently shared without restrictions of distances between the digital box and the digital key or a computer's model.

The other object of the present invention is no requirement of duplicating and saving one single file at different computers or a plurality of data storage devices in order to substantially eliminate difficulty in file update or versions for the data/file duplicated multiply. As a result, files/data and their updates could be effectively managed by one user.

The further object of the present invention is to make sure of safety of data during modification, read-out and write-in of data/files (in a data storage device or a storage space of a digital box's memory unit) in the event of a digital key's peer authentication code and a digital box's peer authentication code belonging to the same group only.

The yet other object of the present invention is a user' portable digital key could deliver data sharing easily by means of one computer from time to time without perplexity out of excessive products born by one user.

To this end, the present invention has the principal technical measures delivered with the following techniques. The present invention is a data sharing system with a digital key for data shared via Internet or a local area network which comprises at least a digital key, at least a digital box and at least a server: the digital key has a USB communications interface, a memory unit, a control unit and a peer authentication code saved in the memory unit; the digital box connected to the server comprises at least a memory unit, at least a control unit, a peer authentication code saved in the memory unit, a programmable firmware and at least a file list; the server comprises at least a grouped peer management list used to manage and validate if the peer authentication codes belong to the same group and at least a file management list used in managing the file list uploaded to the server; the present invention features (1) the control unit links the server to which the peer identification code is provided after the digital key's USB communications interface is electrically connected to a computer's USB port; (2) operations such as modification, read-out or write-in of data/files in a data storage device of the digital box which is electrically connected to a computer could be completed by the computer in the event of the digital key's peer identification code and the digital box's peer authentication code belonging to the same group according to the server's decision.

The purposes and the technical issues with respect to the present invention are further embodied with the following technical measures.

In the said data sharing system with a digital key, the memory unit of the digital box comprises a storage space used to store any data/file.

In the said data sharing system with a digital key, the programmable firmware comprises a file complier module used in compiling any data/file in the data storage device (or in the storage space) to the file list.

In the said data sharing system with a digital key, the programmable firmware comprises a connection module executed by the control unit in order to access both the peer identification code and the file list which are further provided to the server.

In the said data sharing system with a digital key, a demand of connecting a virtual device is issued to the computer by a virtual device module in the control unit of the digital key and an execution file/program, which is saved in the memory unit and used to provide the peer identification code to the server, is automatically executed by the computer after the digital key is electrically connected to the computer linking Internet.

In the said data sharing system with a digital key, the execution file/program is able to supply a user interface exported to the computer's display panel and used to express the server's file management list in the event of the digital key's peer identification code and the digital box's peer authentication code belonging to the same group according to decision of the server.

In the said data sharing system with a digital key, a command for modification, read-out, write-in or addition of data/ files in the data storage device or the storage space could be given by one user via the user interface on the computer.

In the said data sharing system with a digital key, the virtual device module could be one virtual device among a CD-ROM, a hard drive or a floppy disk.

In the said data sharing system with a digital key, the digital box comprises at least one data communications interface among eSATA (External Serial ATA), eSATAp (power over eSATA) and USB (Universal Serial Bus) or a combination of these interfaces thereof by which the data storage device is electrically connected to the digital box.

In contrast to prior arts, the present invention is effective in: (1) Data sharing not restricted in distances between a digital box and a digital key or a computer model and data easily, effectively and conveniently shared; (2) Files/data effectively managed and updated by one user to substantially eliminate difficulty in file update or versions for one single file duplicated multiply; (3) Safety of data because of modification, read-out or write-in only available in a digital key's peer authentication code and a digital box's peer authentication code belonging to the same group; (4) Data easily shared by means of a user' portable digital key and one computer from time to time without perplexity out of excessive products born by one user.

DETAILED DESCRIPTIONS OF THE PREFERRED EMBODIMENTS

Figure 1:
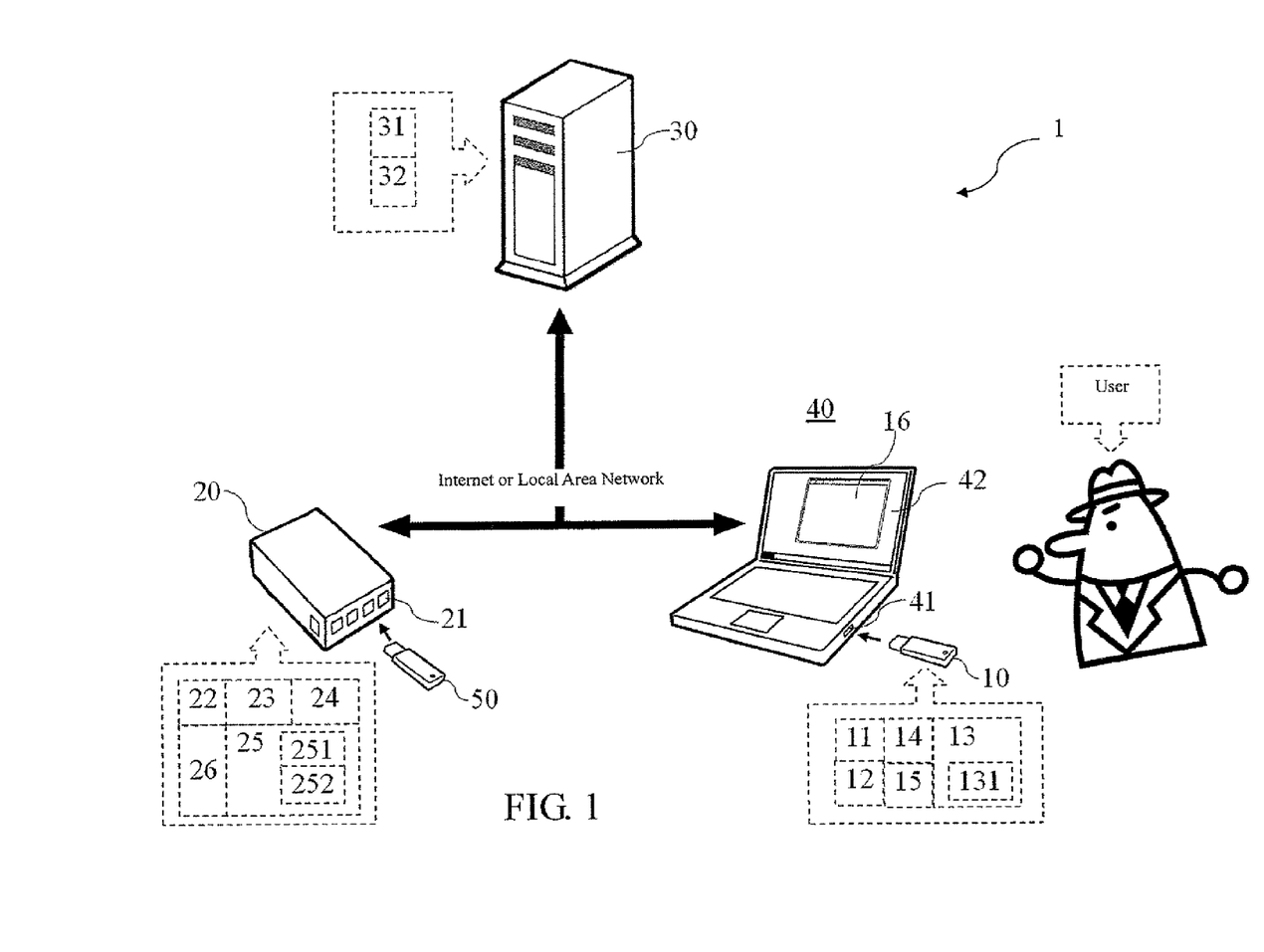
FIG. 1 demonstrates operations of the first embodiment with respect to the present invention.
Figure 2:
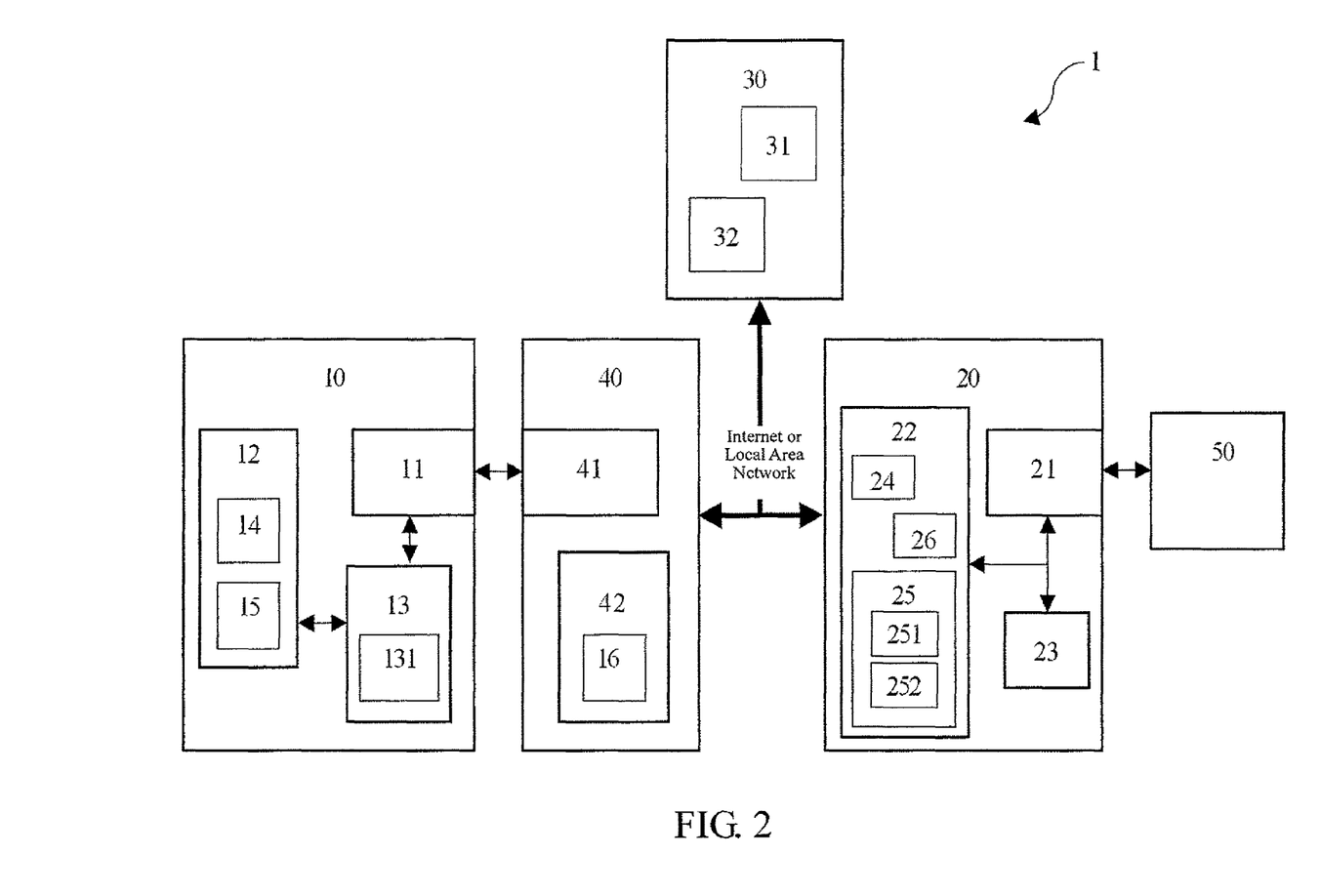
FIG. 2 is the block diagram of the first embodiment with respect to the present invention.

For objects, characteristics, and effects obviously and easily understood, the preferred embodiments of the present invention are particularly interpreted as follows:

FIGS. 1, 2, 3a and 3b indicate the first embodiment of the present invention of a data sharing system with a digital key (1) which performs data sharing via Internet or a local area network. Referring to FIGS. 1 and 2 which illustrate the present invention comprises at least a digital key (10), at least a digital box (20) and at least a server (30) wherein the digital key (10) comprises a USB communications interface (11), a memory unit (12), a control unit (13) and a peer authentication code (14) and an execution file/program (15) saved in the memory unit (12).

The USB communications interface (11) is used to be electrically connected to a USB port (41) of a computer (40); the memory unit (12) is used to supply readable/writable digital data; the control unit (13) connected between the memory unit (12) and the USB communications interface (11) is used in controlling access of data.

Specifically, the computers are machines based on electronics theories which are capable of processing data according to a series of commands and are taken as practical tools to process data in which there are various models including, without limitation, mobile devices, PCs, desktops, tablet PCs, servers and Personal Digital Assists (PDA).

In detail, the control unit (13) comprises a virtual device module (131) from which a request of linking a virtual device is issued to a computer (40) when the digital key (10) is electrically connected to the computer (40) and Internet or a local area network, so that an execution file/program (15), which is saved in the memory unit (12) and used in linking and providing a peer identification code (14) to a server (30), is automatically executed by the computer (40).

Preferably, a virtual device module (131) could be one virtual device among a CD-ROM, a hard drive or a floppy disk.

Referring to FIGS. 1 and 2 which illustrate the digital box (20) comprises at least a data communications interface (21), at least a memory unit (22), at least a control unit (23) and a peer authentication code (24) saved in the memory unit (22), a programmable firmware (25) and at least a file list (26):

The data communications interface (21) could be any data communications interface among eSATA (External Serial ATA), eSATAp (power over eSATA) and USB (Universal Serial Bus) or a combination of these interfaces thereof which is electrically connected to at least a data storage device (50); the control unit (23) electrically connected to the memory unit (22) and the data communications interface (21) is used in controlling access and processing of data. Additionally, the programmable firmware (25) comprises a file complier module (251) which is used to compile data of the data storage device (50) into the file list (26); the programmable firmware (25) also comprises a connection module (252) which is governed by the control unit (23) in order to make the digital box (20) linking the server (30) via Internet or a local area network and providing the peer identification code (24) and the file list (26) to the server (30).

Referring to FIGS. 1 and 2 which illustrate the server (30) comprises at least a grouped peer management list (31) and at least a file management list (32) wherein the grouped peer management list (31) used in managing and validating the peer authentication code (14) of the digital key (10) as well as the peer authentication code (24) of the digital box (20); additionally, the file management list (32) is used in controlling the file list (26) uploaded to the digital box (20) of the server (30).

Figure 3A:
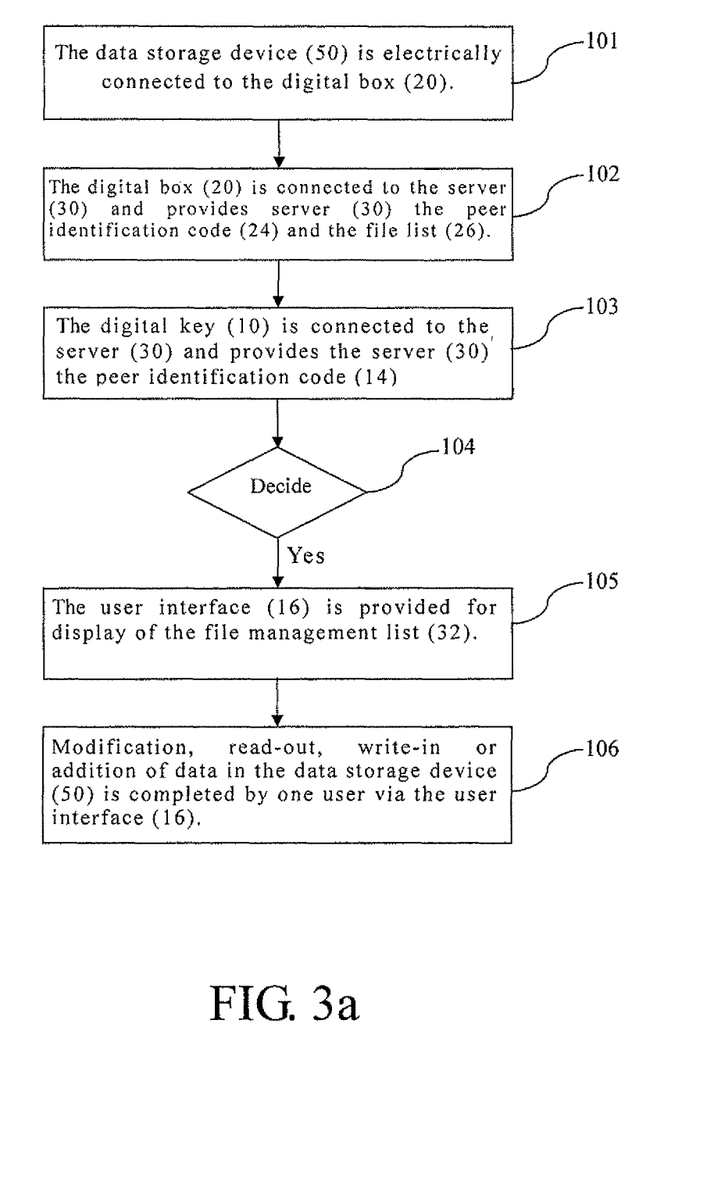
FIG. 3a is the flow diagram for start-up of the first embodiment with respect to the present invention.

Referring to FIG. 3a which illustrates detailed steps for start-up: the data storage device (50) is electrically connected to the digital box (20) (Step 1: 101); the digital box (20) is connected to the server (30) via Internet or a local area network and provides the peer identification code (24) and the file list (26) to the server (30) (Step 2: 102); the digital key (10) is connected to the server (30) via the computer (40) and provides the server (30) the peer identification code (14) (Step 3: 103); the server (30) based on the grouped peer management list (31) decides if the peer identification code (14) of the digital key (10) and the peer authentication code (24) of the digital box (20) belong to the same group (Step 4: 104); a user interface (16) supplied by the execution file/program (15) of the digital key (10) is exported to a display panel (42) on the computer (40) and used to display the file management list (32) of the server (30) (Step 5: 105); modification, read-out, write-in or addition of data in the data storage device (50) according to the file list (32) is completed by one user via the user interface (16) of the computer (40) (Step 6: 106).

Figure 3B:
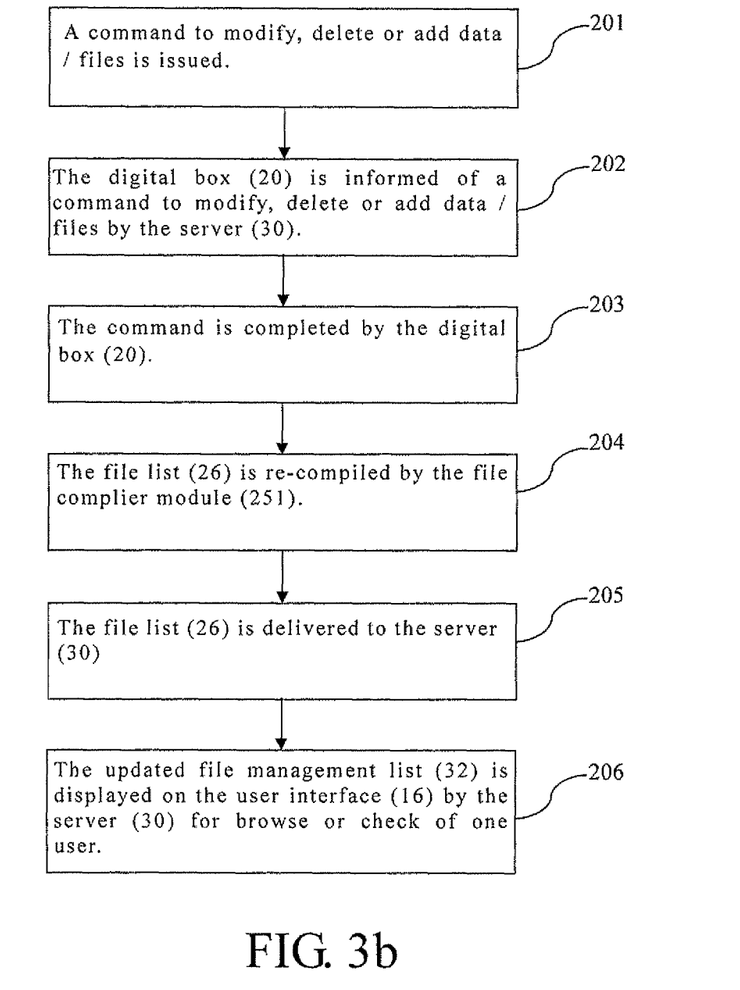
FIG. 3b is the flow diagram of the first embodiment with respect to the present invention for modification (or addition, deletion, etc.) of data/files.

In addition, referring to FIG. 3b which illustrates steps to modify (or add, delete, etc.) data/files: a command to modify, delete or add data/files is issued by one user via the user interface (16) (Step 1: 201); the digital box (20) is informed of a command to modify, delete or add data/files by the server (30) (Step 2: 202); the command is completed by the digital box (20) (Step 3: 203); the file list (26) is compiled by the file complier module (251) of the programmable firmware (25) (Step 4: 204); the file list (26) is delivered to the server (30) (Step 5: 205); the updated file management list (32) is displayed on the user interface (16) by the server (30) for browse or check of one user (Step 6: 206).

Figure 4:
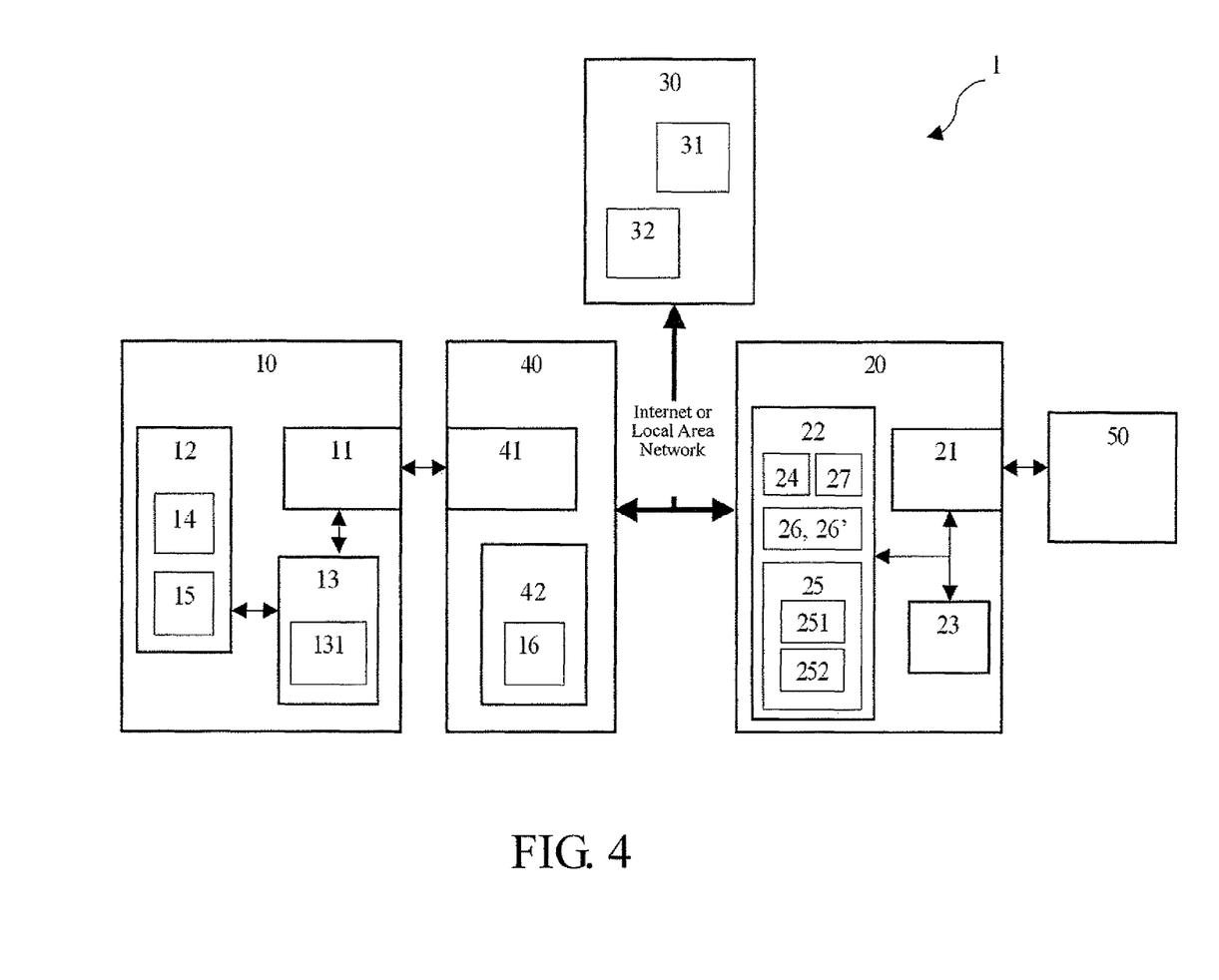
FIG. 4 is the block diagram of the second embodiment with respect to the present invention.
Figure 5A:
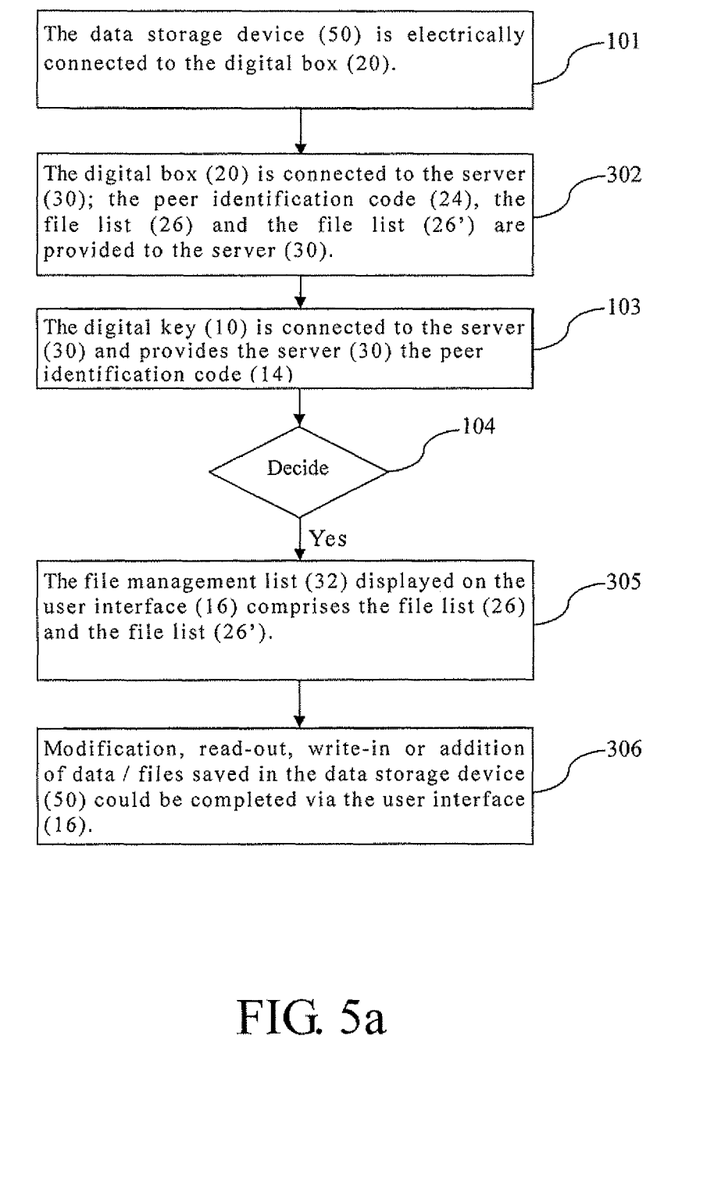
FIG. 5a is the flow diagram for start-up of the second embodiment with respect to the present invention.
Figure 5B:
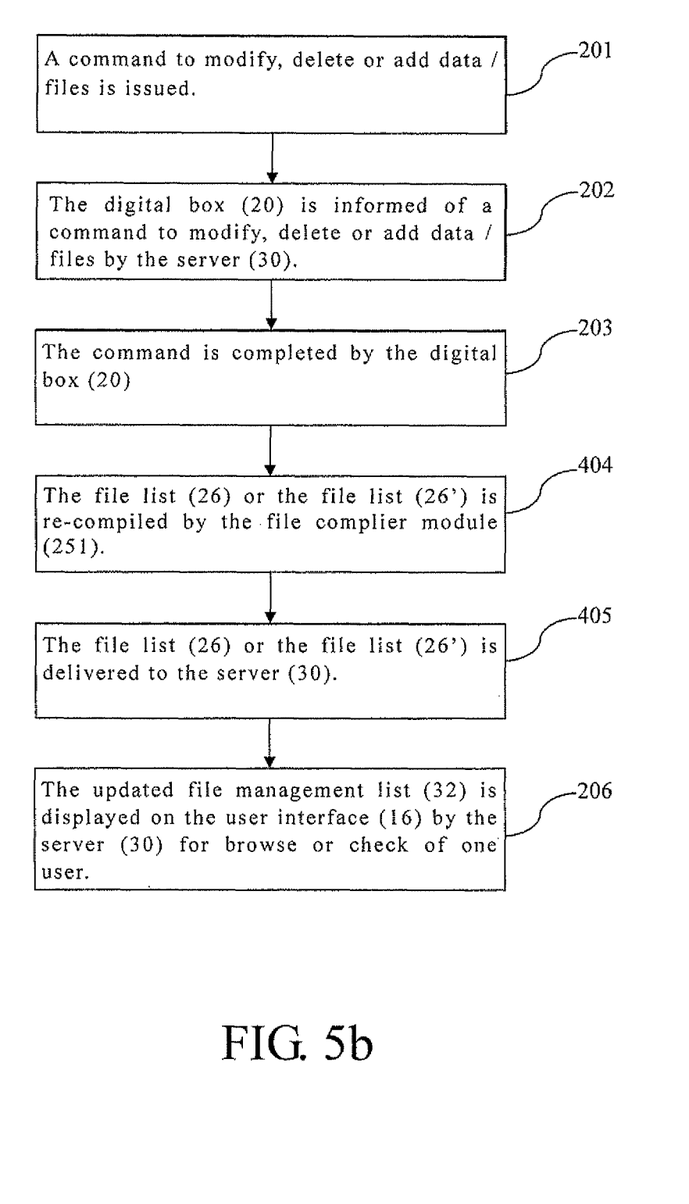
FIG. 5b is the flow diagram of the second embodiment with respect to the present invention for modification (or addition, deletion, etc.) of data/files.

Referring to FIGS. 4, 5a and 5b which illustrate the second embodiment of the present invention wherein the data sharing system with a digital key which has been described in the first embodiment and from FIG. 1 to FIG. 3b are marked with the same symbols in FIGS. 4, 5a and 5b and not repeated interpreted.

Referring to FIG. 4 which illustrates the second embodiment different from the first one is the memory unit (22) in the digital box (20) also comprising a storage space (27) used to store any data/files and the file complier module (251) of the programmable firmware (25) used to compile data/files in the storage space (27) to a file list (26'). Accordingly, the peer identification code (24), the file list (26) (composed of compiled data/files from the data storage device (50)) and the file list (26') (composed of compiled data/files from the storage space (27)) are provided to the server (30) by the digital box (20) via Internet or a local area network and the file list (26) and the file list (26') uploaded to the server (30) are managed by the file management list (32) of the server (30) when the connection module (252) is executed by the control unit (23) according to one command from the connection module (252) of the programmable firmware (25).

Please referring to FIG. 5 which illustrates steps for execution wherein the second embodiment different from the first one features: the digital box (20) is connected to the server (30) via Internet or a local area network and the peer identification code (24), the file list (26) and the file list (26') are provided to the server (30) (Step 2: 302); the file management list (32) of the server (30) displayed on the user interface (16) comprises the file list (26) and the file list (26') (Step 5: 305); modification, read-out, write-in or addition of data/files saved in the data storage device (50) or the storage space (27) according to the file list (32) could be completed by one user via the user interface (16) of the computer (40) (Step 6: 306). Except Steps 2, 5 and 6, other steps of the second embodiment are identical to those of the first one.

Additionally, referring to FIG. 5b which illustrates steps of executing modification (or addition, deletion, etc.) of data/files wherein the second embodiment different from the first one features: the file list (26) or the file list (26') could be re-compiled by the file complier module (251) of the programmable firmware (25) (Step 4: 404); the file list (26) or the file list (26') could be delivered to the server (30) (Step 5: 405). Except Steps 4 and 5, other steps of the second embodiment are identical to those of the first one.

With the above descriptions summarized, the present invention is characteristic of data sharing completed with Internet or a local area network by which there is at least one data storage device electronically connected to a digital box or one memory unit in the digital box comprising a storage space and the digital box is connected to a server. At the moment, a computer user could use one digital key only to link a server via any computer and further complete read-out, write-in, modification, deletion or addition of data/files in the data storage device or the storage space with the digital key's peer identification code and the digital box's peer authentication code belonging to the same group validated by the server. As a result, the present invention is effective in: (1) Data sharing not restricted in distances between a digital box and a digital key or any computer model and data easily, effectively and conveniently shared; (2) Files/data effectively managed and updated by one user to substantially eliminate difficulty in file update and versions for one single file duplicated multiply; (3) Safety of data because of modification, read-out or write-in only available in a digital key's peer authentication code and a digital box's peer authentication code belonging to the same group; (4) Data easily shared by means of a user' portable digital key and one computer from time to time without perplexity out of excessive products born by one user Therefore, the present invention with effects distinct from general portable data storage devices and referred to as creative work among similar products meets patentability and is applied for the patent.

It must be stressed that the said disclosures demonstrate the preferred embodiments of the present invention only and any equivalent change in disclosures, claims or drawings with respect to the present invention is still within the technical scope protected by the present invention which refers to claims hereinafter.

What is claimed is:

1. A data sharing system with a digital key which fulfills data sharing through Internet or a local area network, comprising:
   at least a server;
   at least a digital key comprising a USB communications interface, a memory unit, a control unit and a first peer authentication code saved in the memory unit;
   at least a digital box connected to the server, comprising at least a memory unit, at least a control unit, a second peer authentication code saved in the memory unit, a programmable firmware and at least a file list; the programmable firmware comprising a complier module and a connection module, wherein the complier module is configured for compiling data/files in the data storage device to the file list, and the connection module is configured to access and to provide to the server the second peer authentication code and the file list;
   the server comprising at least a grouped peer management list, which is used to validate if the first and second peer authentication codes belong to a same group, and at least a file management list used to control uploading the file list to the server;
   wherein the control unit is configured to access and provide the first peer identification code to the server when the USB communications interface of the digital key is electrically connected to a USB port of one computer; modification, read-out or write-in of data/files in a data storage device which is electrically connected to the digital box be completed by the computer when the first peer identification code of the digital key and the second peer authentication code of the digital box belonging to the same group is validated by the server.

2. The data sharing system with a digital key according to claim 1 wherein the memory unit of the digital box comprises a storage space used to store any data/file.

3. The data sharing system with a digital key (1) according to claim 1 wherein one demand of connecting a virtual device is issued to the computer by a virtual device module in the control unit of the digital key and an execution file/program, which is saved in the memory unit and used to access and provide the first peer identification code to the server, is automatically executed by the computer when the digital key is electrically connected to the computer linking Internet.

4. The data sharing system with a digital key (1) according to claim 1 wherein the execution file/program could provide a user interface exported to a display panel of the computer which is used to express the file management list from the server when the peer identification code of the digital key and the second peer authentication code of the digital box belonging to the same group is validated by the server.

5. The data sharing system with a digital key according to claim 4 wherein a command about modification, read-out, write-in or addition of data/files in the data storage device or the storage space could be issued by one user via the user interface of the computer.

6. The data sharing system with a digital key according to claim 3 wherein the virtual device module could be any virtual device among a CD-ROM, a hard drive or a floppy disk.

7. The data sharing system with a digital key according to claim 1 wherein the digital box comprises at least a data communications interface among eSATA (External Serial ATA), eSATAp (power over eSATA) and USB (Universal Serial Bus) or a combination of these interfaces thereof by which the data storage device is electrically connected to the digital box.

* * * * *